United States Patent
Schweizer et al.

(10) Patent No.: US 6,789,408 B2
(45) Date of Patent: Sep. 14, 2004

(54) DEVICE AND METHOD FOR TESTING THE ACTIVATION BEHAVIOR OF RESTRAINING MEANS IN A MOTOR VEHICLE

(75) Inventors: Martin Schweizer, Kleinglattbach (DE); Peter Weissflog, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,535

(22) PCT Filed: Sep. 28, 2001

(86) PCT No.: PCT/DE01/03741
§ 371 (c)(1),
(2), (4) Date: Oct. 21, 2002

(87) PCT Pub. No.: WO02/38421
PCT Pub. Date: May 16, 2002

(65) Prior Publication Data
US 2003/0089156 A1 May 15, 2003

(30) Foreign Application Priority Data
Nov. 7, 2000 (DE) ........................ 100 55 088

(51) Int. Cl.[7] ............................................. G01M 17/00
(52) U.S. Cl. ...................... 73/12.01; 701/45; 180/271
(58) Field of Search ............................... 73/12.01, 865.3, 73/865.6; 180/271, 282; 280/727, 728.1, 734, 735; 701/45

(56) References Cited

U.S. PATENT DOCUMENTS

| | | | | |
|---|---|---|---|---|
| 6,023,984 A | * | 2/2000 | Mazur et al. ............... | 73/865.3 |
| 6,035,728 A | * | 3/2000 | Jost ............................ | 73/865.3 |
| 6,128,562 A | * | 10/2000 | Gering ........................ | 701/45 |
| 6,161,439 A | * | 12/2000 | Stanley ................... | 73/862.391 |
| 6,271,747 B1 | * | 8/2001 | Fendt et al. ................ | 340/436 |
| 6,315,074 B1 | * | 11/2001 | Achhammer et al. ....... | 180/282 |
| 6,327,528 B1 | * | 12/2001 | Vallette et al. ................ | 701/45 |
| 6,421,591 B1 | * | 7/2002 | Hackenberg ................ | 701/45 |
| 6,522,998 B1 | * | 2/2003 | Mazur et al. .................. | 703/8 |
| 6,564,132 B2 | * | 5/2003 | Hackenberg ................ | 701/45 |

FOREIGN PATENT DOCUMENTS

| | | |
|---|---|---|
| DE | 42 22 057 | 1/1994 |
| DE | 197 11 734 | 10/1998 |

* cited by examiner

Primary Examiner—Eric S. McCall
(74) Attorney, Agent, or Firm—Kenyon & Kenyon

(57) ABSTRACT

A device and a method, which, upon triggering of the restraint devices via a control device, allow a systematic testing of the triggering characteristics of restraint devices in a motor vehicle under conditions as realistic as possible. For that purpose, the device includes an ambiency simulator, connectable to the control device, for stipulating defined peripheral states, an acceleration device for accelerating the control device, a detector for recording the triggering characteristics of the restraint devices in response to acceleration of the control device, and an evaluator for evaluating the recorded triggering characteristics. In accordance with the method, the control device is programmed for a particular constellation of restraint devices. A defined peripheral state is predefined for the control device thus programmed with the aid of an ambiency simulator. The control device is then accelerated, in this manner provoking a triggering of the restraint devices. Concurrently, the triggering characteristics of the restraint devices, given the current peripheral state, are recorded and evaluated.

10 Claims, 1 Drawing Sheet

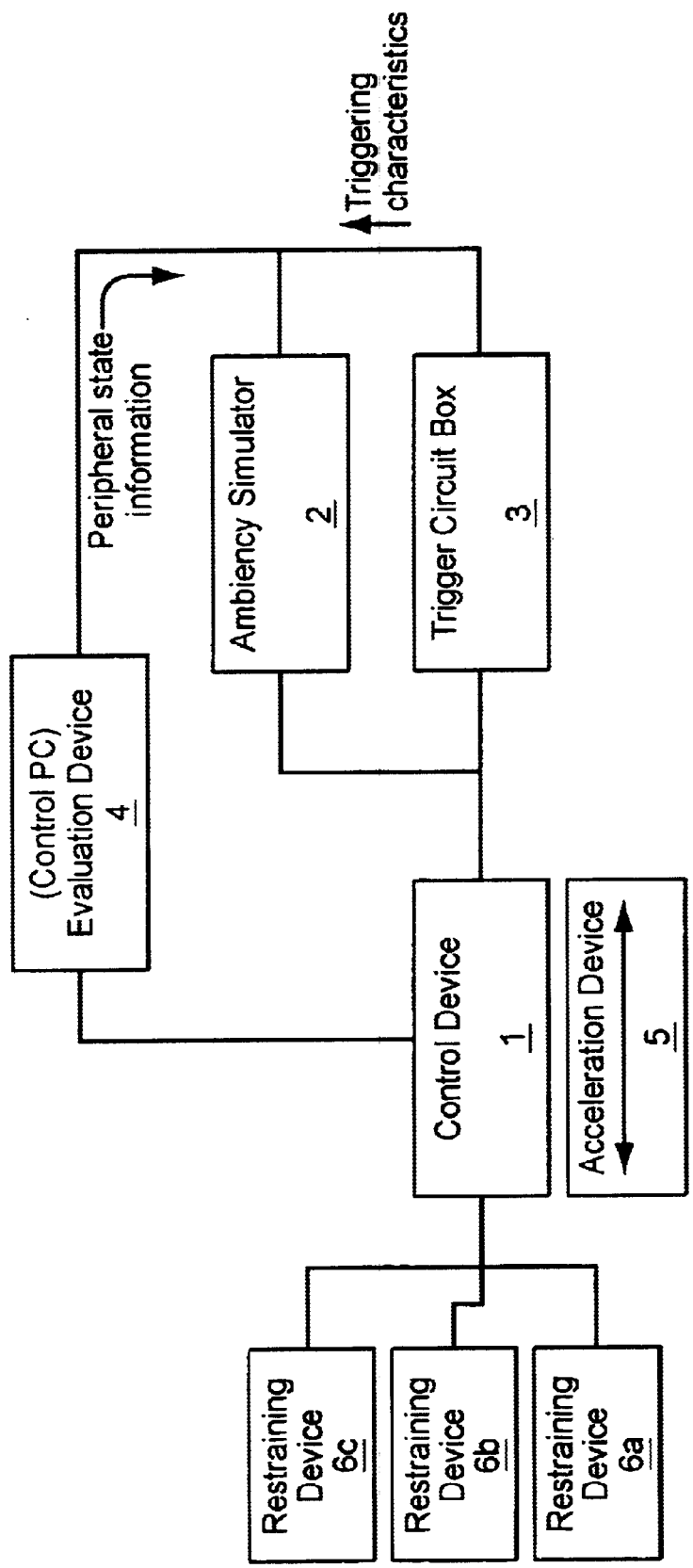

DEVICE AND METHOD FOR TESTING THE ACTIVATION BEHAVIOR OF RESTRAINING MEANS IN A MOTOR VEHICLE

FIELD OF THE INVENTION

The present invention relates to a device and a method for testing the triggering characteristics of restraining devices in a motor vehicle, such as airbags and belt tighteners, in which the restraint devices are triggered via a control device.

BACKGROUND INFORMATION

In modern control devices of this kind, the triggering characteristics of the individual restraint devices installed in the motor vehicle do not only depend on the kind of acceleration to which the motor vehicle and thus the control device is exposed, but also on other status data, such as the speed of the motor vehicle, the position and possibly the weight class of the occupant(s), whether a child-seat is present or not, whether a belt lock is closed or not, etc. These status data are usually detected with the aid of suitable sensors as peripheral state and are transmitted to the control device, so that the instantaneous peripheral state may be taken into account when the individual restraint devices are triggered. Therefore, a multitude of different triggering situations result, given the variation possibilities in regard to equipping a motor vehicle with restraint devices.

In programming the control device, the restraint-device equipment of the motor vehicle desired by the customer is taken into account. The control-device software is usually implemented in a modular manner and testing is carried out during production in an artificial environment solely on a module-basis.

In practice, this method is problematic, not only because an ever increasing number of status data are to be considered in the triggering of the individual restraint devices, but also because the interaction occurring between the individual restraint devices also has to be taken into account. As the number of restraint systems increases, so does the importance of these interactions.

SUMMARY OF THE INVENTION

According to the present invention, a device and a method are provided that allow a systematic testing of the triggering characteristics of restraint devices in a motor vehicle under conditions that are as realistic as possible.

For that purpose, the device according to the present invention includes an ambiency simulator connectable to a control device for stipulating defined peripheral states, an acceleration device for accelerating the control device, detecting means for recording the triggering characteristics of the restraint device in response to the acceleration of the control device, and evaluation means for evaluating the recorded triggering characteristics.

In accordance with the method according to the present invention, the control device is first programmed for a particular constellation of restraint devices. With the aid of an ambiency simulator, a defined peripheral state is then stipulated for the control device. Next, the control device is accelerated, in this manner provoking a triggering of the restraint devices. The triggering characteristics of the restraint devices, given the current peripheral state, will then be recorded and evaluated.

It has been recognized that the interactions occurring between the individual restraint devices upon triggering may only be detected under actual load conditions, i.e., in actual acceleration of the control device and in actual activation of the restraint devices. Furthermore, it has become known that, in contrast to these interactions, the various peripheral states occurring in actuality may be simulated in a simple manner by providing the control device with appropriate status data. Therefore, it is provided in accordance with the present invention, to automatically and systematically test the triggering characteristics of the individual restraint devices of a motor vehicle, on the one hand, under actual load conditions, and in merely simulated peripheral states, on the other hand.

Basically, there are different possibilities for implementing the device or the method according to the present invention.

In an advantageous embodiment, the device according to the present invention includes a control-PC connected to the control device, which may be used to program the control device. In this manner, it is easy to predefine certain constellations of restraint devices, i.e. equipment variants, for the control device.

The control-PC may also be connected to the ambiency simulator, which is advantageous especially in view of an automatic and systematic stipulation of various defined peripheral states.

Finally, the control-PC could also be used in the evaluation of the recorded triggering characteristics.

BRIEF DESCRIPTION OF THE DRAWINGS

The FIGURE shows a block diagram of a device according to the present invention for testing the triggering characteristics of restraint devices in a motor vehicle together with the control device, via which the restraint devices are triggered.

DETAILED DESCRIPTION

The device shown as a block diagram in the FIGURE is used to test the triggering characteristics of restraint devices in a motor vehicle, which are triggered via a common control device 1.

Connected to control device 1 is an ambiency simulator 2, which is used to input defined peripheral states. Ambiency simulator 2 supplies defined status data to control device 1, which are detected during normal vehicle operation by appropriate sensors and supplied to the control device. Therefore, ambiency simulator 2 may systematically predefine a variety of possible peripheral states and any number of possible fault situations for the control device.

Control device 1 itself is mounted on an acceleration device 5. With the aid of the acceleration device 5, control device 1 is accelerated in order to provoke a triggering of the restraint devices e.g., 6a, 6b, 6c.

A trigger-circuit box is connected to control device 1 as detection means 3 to record the triggering characteristics of the restraint devices upon acceleration of control device 1, i.e., for recording the characteristics of the corresponding trigger circuit.

The triggering characteristics of the restraint devices recorded in this manner are evaluated with the help of a control-PC 4, which is connected to trigger-circuit box 3 for this purpose. In the evaluation, the actually observed triggering characteristics and the trigger times may be compared to corresponding stipulations. Control-PC 4 is also connected to control device 1 via a diagnostic cable, so that control device 1 may be programmed via control-PC 4. In particular, a specific constellation of restraint devices, i.e., the desired restraint-device equipment, may be stipulated with the aid of control-PC 4. In addition, control-PC 4 puts ambiency simulator 2 into a defined state, for which purpose it is connected to ambiency simulator 2. In this manner, it is easy to stipulate automatically and systematically defined peripheral states for testing of the triggering characteristics of the restraint devices.

Finally, it should be mentioned again that in the method according to the present invention for testing the triggering characteristics of restraint devices in a motor vehicle, it is the actual triggering characteristics under actual load conditions that are automatically tested by remote-control points of the device periphery. The advantage of the over-all testing is that the testing is carried out on the actual control device under real-time conditions and includes the actual signal path, not only on the side of the acceleration sensor integrated in control device 1, but also on the side of the peripheral devices.

What is claimed is:

1. A device for testing triggering characteristics of restraint devices in a motor vehicle, the restraint devices being triggered via a control device, the device comprising:

an ambiency simulator, adapted to connect to the control device, for inputting defined peripheral states;

an acceleration device for accelerating the control device;

a detection device for recording the triggering characteristics of the restraint devices in response to an acceleration of the control device; and an evaluation device for evaluating the recorded triggering characteristics.

2. The device according to claim 1, further comprising a control-PC connected to the control device for programming of the control device, for stipulating a particular constellation of the restraint devices.

3. The device according to claim 2, wherein the control-PC is connected to the control device via a diagnostic cable.

4. The device according to claim 2, wherein the control-PC is connected to the ambiency simulator for stipulating defined peripheral states.

5. The device according to claim 2, wherein the control-PC evaluates the recorded triggering characteristics.

6. A method for testing triggering characteristics of restraint devices in a motor vehicle, the restraint devices being triggered via a control device, the method comprising:

programming the control device for a particular constellation of restraint devices;

predefining a peripheral state to the control device with the aid of an ambiency simulator;

accelerating the control device so that a triggering of the restraint devices is provoked; and recording and evaluating the triggering characteristics of the restraint devices, given the present peripheral state.

7. The method according to claim 6, wherein a control-PC is connected to the control device for programming the control device to stipulate a particular constellation of the restraint devices.

8. The method according to claim 7, wherein the control-PC is connected to the control device via a diagnostic cable.

9. The method according to claim 7, wherein the control-PC is connected to the ambiency simulator for stipulating defined peripheral states.

10. The method according to claim 7, wherein the control-PC evaluates the recorded triggering characteristics.

* * * * *